United States Patent [19]

Hendy

[11] 4,268,583

[45] May 19, 1981

[54] ANTISTATIC FILMS

[75] Inventor: Brian N. Hendy, Welwyn, England

[73] Assignee: Imperial Chemical Industries Limited, London, United Kingdom

[21] Appl. No.: 17,146

[22] Filed: Mar. 2, 1979

[30] Foreign Application Priority Data

Mar. 15, 1978 [GB] United Kingdom ............ 10337/78

[51] Int. Cl.³ ........................................... B32B 27/08
[52] U.S. Cl. .............................. 428/516; 260/23 H; 428/910
[58] Field of Search ............ 428/516, 910; 260/23 H

[56] References Cited

U.S. PATENT DOCUMENTS

| | | | |
|---|---|---|---|
| 2,832,697 | 4/1958 | Walles | 428/520 |
| 2,891,878 | 6/1959 | Chamberlain | 428/516 X |
| 2,897,170 | 7/1959 | Gruber | 428/375 |
| 3,285,766 | 11/1966 | Barkis et al. | 428/516 X |
| 3,380,844 | 4/1968 | Menikheim et al. | 428/516 |
| 3,397,079 | 8/1968 | DePugh et al. | 428/516 X |
| 4,117,193 | 9/1978 | Tsuchiya et al. | 428/516 X |
| 4,147,291 | 4/1979 | Akao et al. | 428/516 X |

FOREIGN PATENT DOCUMENTS

| | | |
|---|---|---|
| 2340341 | 9/1977 | France |
| 896816 | 5/1962 | United Kingdom |
| 920078 | 3/1963 | United Kingdom |
| 1079402 | 8/1967 | United Kingdom |
| 1558065 | 12/1979 | United Kingdom |

Primary Examiner—Thomas J. Herbert, Jr.
Attorney, Agent, or Firm—Cushman, Darby & Cushman

[57] ABSTRACT

The invention relates to an antistatic film having a polypropylene substrate and a polymeric heat-sealable surface layer on which is present an antistatic composition comprising (a) a quaternary ammonium compound, such as choline chloride, (b) an organic polyol containing at least two free hydroxyl groups, such as glycerol, (c) a glyceride of a long chain fatty acid, such as glyceryl monostearate, and, optionally, (d) an ethoxylated amine salt, such as an ethoxylated tallow amine sulphate.

The composition is conveniently applied directly to the surface of a polymeric extrudate which is subsequently drawn to yield an oriented film, but at least the glyceride may be preblended into the film-forming polymer.

The invention facilitates the production of uniformly antistatic packaging films despite variations in ambient relative humidity.

5 Claims, No Drawings

ANTISTATIC FILMS

This invention relates to a polypropylene film, and, in particular, to an antistatic heat-sealable polypropylene film.

By an "antistatic film" is meant a treated polymeric film exhibiting a reduced tendency, relative to an untreated film, to accumulate static electricity on a surface thereof.

The tendency of polymeric films, particularly oriented packaging films, to accumulate detrimental static electrical charges on surfaces thereof is well known. Consequently, it has been proposed to improve the electrical surface conductivity of a film of this kind, to dissipate electrical charges, by treating the film with one or more of a variety of antistatic agents, including various quaternary ammonium salts, and the like, the selected antistatic agent being applied directly to a surface of the film, suitably in a volatile coating medium, or by incorporating the antistatic agent into the polymeric material prior to fabrication of a film therefrom, in the expectation that the antistatic agent will eventually migrate to a surface of the film.

Various problems have been encountered with hitherto employed antistatic systems, including an inability to achieve consistently uniform and acceptably high electrical conductivities for films manufactured under varying climatic conditions.

We have now devised an improved antistatic film which runs well on packaging machinery.

Accordingly, the present invention provides an antistatic film having a substrate layer of a propylene polymer and, on at least one surface thereof, a polymeric heat-sealable layer characterised by the presence on the external surface of said heat-sealable layer of a composition comprising (a) a quaternary ammonium compound of general formula

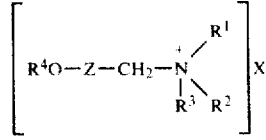

wherein each of $R^1$, $R^2$, and $R^3$, which may be the same or different, is a hydrogen atom or a lower alkyl radical containing from 1 to 6 carbon aoms, or $R^1$ and $R^2$ are each methylene groupings within a common five- or six-membered saturated heterocyclic ring, Z is a methylene group when $R^4$ is a hydrogen atom or an acyl radical containing up to 15 carbon atoms, or Z is a carbonyl group when $R^4$ is a hydrogen atom, and X is a univalent anion or an equivalent of a multivalent anion, (b) an organic polyol containing from 3 to 12 carbon atoms and at least two free hydroxyl groups in its molecule, and (c) a glyceride of a fatty acid containing up to 22 carbon atoms in its molecule.

The lower alkyl radicals in the aforementioned formula of the quaternary ammonium compound are preferably methyl or ethyl radicals, while the anion X, which may be any anion, including a divalent ion, such as tartrate, is suitably a nitrate or chloride ion. A preferred quaternary compound is choline chloride of formula

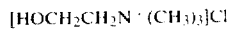

Choline chloride is a particularly advantageous agent for use in packaging films in that it is colourless, non-toxic, being an essential constituent of the mammalian diet, substantially odourless, and an extremely effective antistatic agent because its small molecule yields highly mobile ions.

Choline ester salts of general formula

wherein R is a linear alkyl radical containing not more than 15 carbon atoms, and X is as hereinbefore defined, may also be employed. Suitable ester salts include N-(hexanoyl-oxyethyl)-trimethyl ammonium chloride.

Betaine,

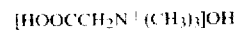

is another suitable quaternary ammonium compound.

The organic polyol component of the antistatic surface composition is suitably an aliphatic compound, including a monosaccharide, such as glucose, and a disaccharide, such as sucrose, but is preferably of the general formula

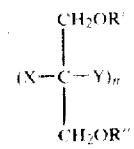

wherein each of R' and R", which may be the same or different, is hydrogen or an acyl radical containing from 2 to 20 carbon atoms, X is —H or —CH$_2$OR', Y is —OH or —CH$_2$OR', and n is an integer from 1 to 10, with the proviso that at least two free hydroxyl groups are present in the molecule. The polyol is preferably a liquid, non-crystalline material of relatively low molecular weight to assist migration of the polyol in or on a substrate treated therewith, and of low volatility to assist retention of the polyol in association with the substrate. Glycerol, HOCH$_2$CH(OH)CH$_2$OH, is a preferred polyol, and, being a component of the human diet, is non-toxic. Pentaerythritol and low molecular weight polyethylene glycols, for example having a molecular weight (weight average) of from 300 to 400, are also of utility.

The glyceride component of the antistatic surface composition may be a mono-, di- or tri-glyceride or a mixture of two or more thereof. A simple glyceride containing two or more identical fatty acid residues, or a mixed glyceride containing different acid residues, may be employed. The fatty acid, preferably containing from 8 to 22 carbon atoms, from which the glyceride is derived is preferably a saturated fatty acid, such as stearic acid or behenic acid. A particularly suitable component is glyceryl monostearate containing at least 50 weight percent of the alpha form of the monoester.

In a preferred embodiment of the invention the antistatic surface composition includes, in addition to the hereinbefore defined quaternary ammonium compound organic polyol and glyceride, an amine salt of general formula

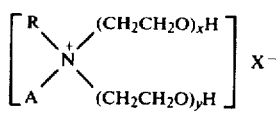

wherein x is a positive integer, y is zero or a positive integer, the sum of x and y is from 2 to 5, A is a hydrogen atom and when y is zero A may also be a lower alkyl group containing from 1 to 6 carbon atoms, R is a univalent aliphatic radical containing from 8 to 22 carbon atoms, and X is a univalent anion or an equivalent of a multivalent anion.

Suitably, the amine salt is an amine sulphate, and it is preferred to use amine sulphates of the aforementioned general formula in which the sum of x and y is 2, A=H, and R is a mixture of aliphatic hydrocarbon radicals having 8 to 18, preferably 12 to 18, carbon atoms, particularly those which are derived from tallow or soya oil and are predominantly composed of hexadecyl, octadecyl and octadec-9-enyl (oleyl) radicals or derived from coconut oil and predominantly (e.g. 50 wt %) composed of dodecyl with a minor proportion (e.g. up to 20 wt %) of tetradecyl radicals. Examples of suitable amines from which amine sulphates may be pepared are sold as 'Ethomeen' T/12, 'Ethomeen' S/12 and 'Ethomeen' C/12 (Armour Hess Division of Akzo Chemie UK Limited).

The proportions of the quaternary ammonium compound, organic polyol, and glyceride and optionally of the amine salt, may vary within a wide range, and desirably should be selected by simple experimentation to provide at the film surface a composition which confers upon that film a surface resistivity (measured at 50% Relative Humidity and a temperature of 25° C.) not exceeding 10, and preferably less than 5.0 gigohms per square.

The long chain amine salts, of the hereinbefore defined general formula, are generally less effective, on a weight for weight basis, as antistatic agents than short chain quaternary ammonium compounds, such as choline chloride, and the amine salt, if included, is therefore present in the composition on the film surface in a relatively minor proportion, primarily to impart surfactant characteristics which assist the effective and uniform distribution of the composition over the film surface. Desirably each of the components of the composition is present in an amount which will provide at least a monomolecular layer at the film surface. Conveniently, therefore, the composition at the film surface comprises, based on the total weight of the film (substrate plus heat-sealable layer(s)), from 0.001 to 0.5 wt % of the quaternary ammonium compound, from 0.001 to 0.75 wt % of the organic polyol, from 0.005 to 0.75 wt % of the glyceride, and from 0 to 0.05 wt % of the amine salt. A preferred composition range at the film surface comprises from 0.005 to 0.25 wt % of the quaternary ammonium compound, from 0.005 to 0.5 wt % of the organic polyol, from 0.025 to 0.5 wt % of the glyceride, and from 0.0001 to 0.025 wt % of the amine salt.

The antistatic composition may be associated with the film surface by conventional blending techniques—for example, by tumble blending the components of the antistatic composition which are thermally stable at the extrusion temperature with the thermoplastic polymeric film-forming material, and subsequently extruding and fabricating the blend by known film-forming techniques, thereby enabling the antistatic composition to migrate through the interior of the film and on to a surface thereof. Alternatively, the antistatic composition may be deposited directly on to the external surface of the heat-sealable layer remote from the substrate layer, conveniently as a solution or dispersion in a suitable medium—preferably, for economy and ease of application, in an aqueous medium. In a preferred embodiment of the invention a combination for preblending and wash-coating is employed in which, for example, the relatively insoluble glyceride is incorporated into the polymeric film-forming blend and allowed to migrate to the surface of the resultant film, while the quaternary ammonium salt, the organic polyol and, optionally, the amine salt, are subsequently applied to the external film surface in a suitable liquid medium.

The concentration of the antistatic composition in the liquid coating medium depends, inter alia, on the level of antistatic properties required in the treated film, and relatively high concentrations may be employed, provided that the viscosity of the solution or dispersion is not increased to a level which adversely affects the mobility and spreadability thereof. In practice, the antistatic composition is conveniently employed at a concentration of from 1 to 50 wt %, preferably from 2.5 to 35 wt %, and particularly preferably from 5 to 15 wt %, based on the weight of the solution or dispersion. It will be appreciated that because of partitioning between the substrate and heat-sealable layers the concentration of any antistatic component(s) preblended into the film-forming polymer must be increased to a level which, after migration through the film structure, will provide an adequate concentration of that component in the electrically conductive ionic layer at the film surface. For example, the glyceride, if preblended, desirably constitutes from 0.1 to 2, and preferably from 0.4 to 1.0, percent by weight of the film-forming polymer.

The substrate layer of films according to the invention is suitably a homo- or a co-polymer of propylene. A preferred material is a high molecular weight stereoregular predominantly crystalline polymer of propylene, either in the form of a homopolymer or copolymerised with minor quantities (e.g. up to 20% by weight of the copolymer) of other unsaturated monomers, such as ethylene.

The polymeric heat-sealable layer may be formed from any homo- or co-polymer which adheres well to the substrate, and which can be melted in a temperature range below the melting temperature of the substrate polymer to yield seals of acceptable strength using standard heat-sealing equipment. Preferably, the heat-sealable polymer is an olefin homopolymer such as high density polyethylene or an olefin copolymer such as an ethylene-butene-1 copolymer. A particularly suitable heat-sealable polymer comprises a random copolymer of propylene (80 to 95% by weight) with another alpha-olefin containing from 4 to 10 carbon atoms, such as butene-1, as described in British Pat. No. 1 452 424, or a blend of said propylene-alpha-olefin copolymer with from 25 to 95% by weight of the blend of a polymer of an alpha-olefin containing from 4 to 10 carbon atoms in its molecule, such as butene-1, copolymerised with from 0 to 10% by weight of the copolymer of an alpha-olefin containing from 2 to 10 carbon atoms in its molecule, as described in British Pat. No. 1 495 776.

Multiple-layer films according to the invention are formed from the aforementioned materials by conventional film-forming techniques, a coextrusion technique involving simultaneous coextrusion of a polypropylene substrate and polymeric heat-sealable layer being particularly suitable.

The films may be unoriented or uniaxially oriented, but are preferably biaxially oriented by drawing in two mutually perpendicular directions in the plane of the film to impart strength thereto. Because of the relatively low melting temperature of the heat-sealable polymeric layer the latter will normally remain substantially unoriented when a coextruded film is drawn to orient the substrate. Orientation of flat film may be effected by a stenter technique, while oriented tubular film is suitably produced by melt extruding the polymeric material in the form of a tube from an annular die, cooling the extruded tube (the cast tube), reheating and inflating the tube by the so-called "bubble" process to introduce transverse orientation, and simultaneously elongating the tube longitudinally to orient the film in a lengthwise direction.

The oriented film is preferably "heat-set", i.e. dimensional stability of the film is improved by heating the film, while restrained against thermal shrinkage, to a temperature above the glass transition temperature of the polymer from which the film substrate is formed but below the melting point thereof. In practice, heat-setting has been observed to hasten the development of surface conductivity, particularly in films according to the invention in which a glyceride of a saturated $C_8-C_{22}$ fatty acid (e.g. glyceryl monostearate) has been preblended into the substrate layer, a non-heat-set film of this kind developing significant surface conductivity only after a long delay whereas the heat-set film exhibits a virtually instantaneous development of acceptable surface conductivity. Heat-setting has proved to be less effective in developing surface conductivity where a glyceride of an unsaturated fatty acid, such as glyceryl monooleate, is at the film surface.

It is believed that the mobility of the glyceride through the substrate and heat-sealable layer, to the external surface thereof, increases as the crystallinity and melting temperature of the glyceride are increased, and that heat-setting assists the establishment of an appropriate equilibrium distribution of the glyceride. Migration to the external surface is particularly satisfactory for glycerides having a melting temperature in excess of about 60° C. It is further believed that electrical surface conductivity is enhanced if at least a portion of the glyceride present on the external film surface is in the amorphous state.

As hereinbefore described, the antistatic composition may be associated with the film by blending with the polymeric material prior to formation of a film therefrom, or by wash-coating, or by a combination of preblending and subsequent wash-coating. However, the relatively soluble components of the antistatic composition, such as the quaternary ammonium compound and organic polyol, are required in only relatively small amounts and are preferably applied to a surface of the film as a solution or dispersion. While the solution or dispersion may be applied between the orienting steps of a sequential drawing procedure, we prefer to apply the solution or dispersion to the cost, unoriented extrudate immediately prior to the reheating and orienting stage of the film-forming process. Evaporation of the volatile medium (water) is therefore effected during the reheating operation, and the antistatic composition becomes firmly bound to the film surface during orientation.

Films according to the invention may conveniently contain any of the agents conventionally employed in the manufacture of thermoplastic polymeric films. Thus, agents such as dyes, pigments, lubricants, stiffening aids, anti-oxidants, anti-blocking agents, surface-active agents, slip aids, gloss-improvers, prodegradants, and ultra-violet light stabilisers may be employed. In particular, the development of surface conductivity may be assisited by the presence in or on the film of low molecular weight non-electrolytes added to promote properties other than conductivity, typical non-electrolytic additives being an anti-blocking aid, such as oleamide, and a surfactant, such as a long chain amine of the kind defined in the aforementioned general formula of the optional amine salt component of the treatment composition. These additional additives are conveniently present in respective concentrations of from 0.01 to 1% (preferably about 0.2%) and from 0.01 to 1% (preferably about 0.15%) by weight of the film, and may be incorporated into the polymeric melt from which the film is formed, in which case they migrate to the film surface where they induce electrical continuity in the electrolyte layer, or they may be applied directly to a surface of the film. Application of these additional additives directly to the film surface is less desirable in that they are not readily soluble in the preferred medium (water), and it is difficult to apply them in amounts which are not excessive in relation to the amount of the electrolytic antistatic composition.

Films according to the invention may vary in thickness depending on the intended application, but usually we find that films having a total thickness of from 2 to 150 microns are of general utility. Films intended for use in packaging operations are preferably within a thickness range from 10 to 50 microns.

The ratio of the thickness of the polypropylene substrate to that of the heat-sealable layer may vary within a wide range, although it is preferred that the thickness of the heat-sealable layer should not be less than 0.2% (preferably 0.5%), nor greater than 50% of that of the substrate. In practice, the electrical surface conductivity increases in relation to the thickness of the high density heat-sealable layer, and to ensure an acceptably high conductivity, it is preferred that the thickness of the heat-sealable layer should be at least 0.05 micron and preferably should not greatly exceed about 2.0 microns, a particularly suitable range of thickness being from 0.2 to 1.0 micron.

The films may be subjected to conventional after-treatments—for example, a corona discharge treatment to improve the bonding and print-receptive properties of the film surface.

The treatment of oriented polymeric films to induce antistatic properties therein is a skilled art and is susceptible to many difficulties. For example, variation in antistatic characteristics may occasionally be related to changes in climatic conditions with particularly poor and irreproducible behaviour being observed when the treatment is effected in an environment of low ambient humidity, e.g. a Relative Humidity of less than 35%, such as might be encountered during a UK winter. Likewise, the surface of the treated films may be marred by surface blemishes, particularly when an antistatic composition has been applied and spread directly onto the film surface. Inclusion of an organic polyol in the antistatic surface compositions has been observed to achieve a significant improvement in these respects by enabling acceptable antistatic treatment to be effected under conditions of low humidity at the time of treatment, and significantly reducing the incidence of surface blemishes on films coated with the compositions.

Although the polyol probably provides little direct contribution to the development of antistatic characteristics, its presence in combination with the other hereinbefore specified additives ensures consistent production of conductive and optically acceptable film to which quality control procedures can be readily applied during the manufacturing process rather than at some later stage. The presence of the polyol is particularly desirable in the production of oriented tubular films rendered antistatic by a pre-draw coating technique involving deposition and spreading of an antistatic medium directly onto the surface of a polymeric, tubular, film-forming extrudate. Hitherto, films produced in this way, particularly at low relative humidity, have experienced capricious surface defects such as streaks apparently derived from the surface spreading equipment. Defects of this nature, even when latent can be demonstrated by exposing the deflective film to an atmosphere of steam. However, in the presence of the polyol these defects are eliminated under virtually all processing conditions. The polyol is therefore an invaluable processing aid for the manufacture of an oriented antistatic polymeric film by a pre-draw coating technique.

The invention is illustrated by reference to the following Examples.

EXAMPLES 1 TO 8

These Examples record variations in film characteristics in response to changes in the coating medium applied to a tubular film substrate throughout a film-forming run operated continuously for one day, Examples 1 and 7 being comparative and not according to the invention.

EXAMPLE 1

From an annular coextrusion die a composite triple-layer tube, having a polypropylene core with a layer of a propylene-butene-1 copolymer on each surface thereof, was extruded downwardly at a rate of 280 kg/hour, and was cooled by means of the internal quenching mandrel and external water bath. The core contained 0.6 percent by weight of glyceryl monostearate based on the weight of the polymeric tube. The resulting cast tube, having a diameter of about 152 mm (6 inches) and wall thickness of about 0.94 mm (0.037 inch), was forwarded by nip rolls, then heated by passage through annular infra-red heaters and inflated to form a bubble, which was then collapsed to yield a biaxially oriented tubular film exhibiting a draw ratio of about 7:1 in each of the longitudinal and transverse directions, and having a thickness of about 20 um. the thickness of the heat-sealable propylene-butene-1 copolymer layer on each surface of the film was about 1.1 microns. The tubular film was then slit to form a flat film which was heat-set, at a temperature of about 120° C., on a system of matt-surfaced, hot rollers of the kind described in British Pat. No. 1 124 886.

An annular spreading assembly having 6 resilient spreading members each faced with a contact pad (6 mm thick) of an expanded neoprene backing layer with a nylon cloth contact layer engaging the tube surface, was located between the nip rolls and the infra-red heater bank.

An aqueous solution comprising 3.0 wt % choline chloride, 0.2 wt % 'Ethomeen' T/12 sulphate (prepared by reacting an aqueous solution of 'Ethomeen' T/12 with concentrated sulphuric acid), and 96.8 wt % water, was continuously sprayed onto the cast tube upstream of the spreading assembly, from four symmetrically spaced spray heads, at a total rate of 11 ml/minute, and spread around the tube surface by means of the spreading assembly which was rotated at a speed of 90 rpm.

Ambient temperature and Relative Humidity in the vicinity of the spreading assembly were recorded at intervals during the coating operation.

After orienting, slitting and heat-setting, two films (A and B), each of width approximately 1670 mm, were derived from the coated tube. The surface conductivity of each film (average of several readings uniformly spaced across the width of the film) was measured at 25° C. by means of a simple apparatus comprising a DC power supply of 70 volts in series with an electronic microammeter and with an electrode assembly comprising a pair of knife-edged electrodes each of 100 mm length and spaced apart in parallel by a distance of 0.25 mm. To measure surface conductivity of the film, the electrode assembly was placed on the film at the desired position thereby completing an electrical circuit through the apparatus. The conductivity recorded by the microammeter provided an indication of the effectiveness of the applied coating in the area under test.

The average surface conductivity (in units of $10^{-12}$ mhos per square) was measured on samples of film produced respectively 2 and 3 hours after commencement of the coating operation. Samples of film produced at the same times were also inspected visually for the appearance of surface blemishes in the form of diagonal streaks or lines apparently caused by rotation of the spreading assembly about the cast tube.

The procedure of Example 1 was continued throughout the duration of the run save that for the respective periods of time devoted to each of Examples 2 to 6 and 8 glycerol was added to the "standard" coating solution (choline chloride 3 wt %; 'Ethomeen' T/12 sulphate 0.2 wt %; water 96.8 wt %) at the rate specified:

EXAMPLE 2

1 ml glycerol per 100 ml "standard" solution, i.e. glycerol (density 1.26) concentration of 1.24 wt %, based on the total weight of the coating solution.

EXAMPLE 3

2 ml glycerol per 100 ml "standard" solution, i.e. glycerol concentration of 2.45 wt %.

EXAMPLE 4

3 ml glycerol per 100 ml "standard" solution, i.e. glycerol concentration of 3.65 wt %.

EXAMPLE 5

4 ml glycerol per 100 ml "standard" solution, i.e. glycerol concentration of 4.8 wt %.

EXAMPLE 6

5 ml glycerol per 100 ml "standard" solution, i.e. glycerol concentration of 5.9 wt %.

EXAMPLE 7

Glycerol not added to coating solution.

EXAMPLE 8

3.5 ml glycerol per 100 ml "standard" solution, i.e. glycerol concentration of 4.2 wt %.

Throughout the run the glycerol concentration in the coating solution was therefore varied in cyclical fashion.

Results of these Examples are recorded in the accompanying Table.

EXAMPLE 10

This Example demonstrates the influence of heat-setting on the development of film surface conductivity.

The procedure of Example 8 was repeated save that the coated, oriented film was not heat-set. The surface conductivity of film samples examined immediately after manufacture was zero. After storage for three weeks the film samples developed a surface conductiv-

TABLE

| | Glycerol in coating solution | | Elapsed time from start of coating | Film Appearance | Surface conductivity ($10^{-12}$ mhos/sq) | | Coating Environment | |
|---|---|---|---|---|---|---|---|---|
| Example | ml/100 ml | wt. % | (hours) | (streaks) | Sample A | Sample B | Relative Humidity (%) | Ambient Temperature (°C.) |
| 1a | 0 | 0 | 2 | Faint | <1 | 5 | 34 | 18.5 |
| 1b | 0 | 0 | 3 | Faint | <1 | 8 | 30 | 18.5 |
| 2a | 1 | 1.24 | 4 | None | 17 | 13 | 32 | 19 |
| 2b | 1 | 1.24 | 4.5 | None | 12 | 19 | 30 | 18 |
| 3a | 2 | 2.45 | 8$^a$ | None | 9 | 8 | 27 | 18 |
| 3b | 2 | 2.45 | 9 | None | 13 | 20 | 33 | 17.5 |
| 3c | 2 | 2.45 | 10 | None | 16 | 14 | 30 | 17.8 |
| 4a | 3 | 3.65 | 11 | None | 18 | 29 | 28 | 19 |
| 4b | 3 | 3.65 | 12 | None | 25 | 84 | 28 | 19.4 |
| 5a | 4 | 4.8 | 13 | None | 60 | 123 | 27 | 20.1 |
| 5b | 4 | 4.8 | 14 | None | 68 | 51 | 30 | 19.5 |
| 6a | 5 | 5.9 | 15 | None | 93 | 78 | 30 | 18.5 |
| 6b | 5 | 5.9 | 16 | None | 102 | 75 | 31 | 18.2 |
| 7a | 0 | 0 | 17 | Bad | 2 | 6 | 31 | 18 |
| 7b | 0 | 0 | 18 | Bad | 5 | 17 | 30 | 18.5 |
| 8a | 3.5 | 4.2 | 19 | None | 122 | 94 | 30 | 16.7 |
| 8b | 3.5 | 4.2 | 20 | None | 89 | 71 | 31 | 17.3 |
| 8c | 3.5 | 4.2 | 21 | None | 110 | 125 | 31 | 16 |
| 8d | 3.5 | 4.2 | 22 | None | 120 | 178 | 35 | 16.5 |

Footnote to Table
$^a$Continuity was briefly interrupted by a bubble burst at this stage of the run.

These results demonstrate the dramatic influence of glycerol in eliminating the appearance of streaks on the film surface, increasing the electrical conductivity of the film surface, and enabling acceptable surface conditions to be achieved in an environment of low Relative Humidity.

EXAMPLE 9

This is a comparative Example, not according to the invention, to illustrate the influence of Relative Humidity.

The coating procedure of Examples 1 and 7 was repeated, i.e. no glycerol present in the coating solution, in an environment of varying Relative Humidity, and film surface conductivities measured as hereinbefore described. Results are recorded in the accompanying Table.

TABLE

| Example | Coating Environment Relative Humidity (%) | Film Surface Conductivity ($10^{-12}$ mhos/sq) |
|---|---|---|
| 9a | 61 | 563 |
| 9b | 47 | 436 |
| 9c | 46 | 151 |
| 9d | 42 | 164 |
| 9e | 37 | 25 |
| 9f | 35 | 26 |
| 9g | 35 | 21 |
| 9h | 35 | 15 |

These results demonstrate the inferior conductivities achieved (in the absence of glycerol) when the coating operation is effected in an environment of Relative Humidity less than about 40%.

ity of the order of 20 units.

By comparison, the heat-set films made under the same conditions, exhibited surface conductivity, measured immediately after manufacture, in excess of 100 units (Examples 8b and 8c).

EXAMPLE 11

This Example demonstrates the effect of varying the concentration of glyceryl monostearate in the polypropylene film substrate.

Film samples having a propylene homopolymer core of about 20 μm thickness with a heat-sealable layer of a propylene-butene-1 copolymer of 0.73 μm thickness on each surface were prepared by a technique similar to that employed in Example 1. The concentration of glyceryl monostearate in the core layer was varied as illustrated in the accompanying Table.

An aqueous solution, comprising 3.2 wt % choline chloride, 4.2 wt % glycerol, 0.19 wt % 'Ethomeen' T/12 sulphate and 92.41 wt % pure water, was applied to the external surface of the tubular extrudate which was then biaxially oriented as described in Example 1.

The resultant films, prior to heat-setting, exhibited negligible electrical surface conductivity. After heat-setting at 120° C. as described in Example 1, the various film samples exhibited the surface conductivities (measured at 50% Relative Humidity and 25° C.) recorded in the following Table.

TABLE

| Example | Glyceryl monostearate in core (wt. %) | Surface Conductivity ($10^{-12}$ mhos/sq) |
|---|---|---|
| 11a | 0.35 | 10 |

TABLE-continued

| Example | Glyceryl monostearate in core (wt. %) | Surface Conductivity ($10^{-12}$ mhos/sq) |
|---|---|---|
| 11b | 0.40 | 111 |
| 11c | 0.50 | 515 |
| 11d | 0.70 | 349 |
| 11e | 0.90 | 470 |

It is observed that for the samples in question with a heat-sealable coat thickness of 0.73 um, the surface conductivity of the heat-set film declines sharply as the glyceryl monostearate content of the substrate layer is reduced below 0.4 wt %.

EXAMPLE 12

This Example demonstrates the influence of the thickness of the heat-sealable layer on surface conductivity.

Film samples having a propylene homopolymer core and heat-sealable propylene-butene-1 surface layers were prepared by the procedure of Example 11 save that the concentration of glyceryl monostearate on the core layer was maintained constant at 0.7 wt % of the film-forming polymers and that the thickness of the heat-sealable layers were varied. The core layer had a thickness of about 20 μm.

Prior to heat-setting the film samples exhibited negligible surface conductivity. After heat-setting as described in Example 11 the film sample exhibited the surface conductivities (measured at 50% Relative Humidity and 25° C.) recorded in the following Table.

TABLE

| Example | Heat-seal coat thickness μm | Surface Conductivity ($10^{-12}$ mhos/sq) |
|---|---|---|
| 12a | 0 | 5 |
| 12b | 0.40 | 233 |
| 12c | 0.73 | 349 |

I claim:

1. A multiple-layer, heat-set, antistatic film having a biaxially oriented substrate layer of a propylene polymer and, on at least one of the two surfaces thereof, a heat-sealable layer of an olefin polymer melting in a temperature range below the melting temperature of the substrate polymer, said heat-sealable layer having on the external surface thereof remote from said substrate layer a composition comprising, based on the total weight of the film,
   (a) from 0.005 to 0.25 weight % of a quaternary ammonium compound of the formula

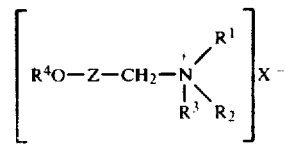

wherein each of $R^1$, $R^2$, and $R^3$, which may be the same or different, is a hydrogen atom or a lower alkyl radical containing from 1 to 6 carbon atoms, or $R^1$ and $R^2$ are each methylene groupings within a common five- or six-membered saturated heterocyclic ring, Z is a methylene group when $R^4$ is a hydrogen atom or an acyl radical containing up to 15 carbon atoms, or Z is a carbonyl group when $R^4$ is a hydrogen atom, and X is a univalent anion or an equivalent of a multivalent anion,
   (b) from 0.005 to 0.5 weight % of an organic polyol containing at least two free hydroxyl groups and of general formula

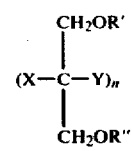

wherein each of R' and R", which may be the same or different, is hydrogen or an acyl radical containing from 2 to 20 carbon atoms, X is —H or —CH$_2$OR', Y is —OH or —CH$_2$OR', and n is an integer from 1 to 10, and
   (c) from 0.025 to 0.5 weight % of a glyceride of a saturated fatty acid containing up to 22 carbon atoms in its molecule.

2. A film according to claim 1 wherein there is present on the external surface from 0.0001 to 0.025 percent by weight of an amine salt having the formula

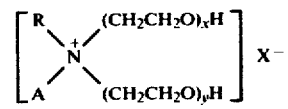

wherein x is a positive integer, y is a positive integer, the sum of x and y is from 2 to 5, A is a hydrogen atom, R is a univalent aliphatic radical containing from 8 to 22 carbon atoms, and X is a univalent anion or an equivalent of a multivalent anion.

3. A film according to claim 1 wherein the quaternary ammonium compound is choline chloride.

4. A film according to claim 1 wherein the organic polyol is glycerol.

5. A film according to claim 1 wherein the glyceride is glyceryl monostearate.

* * * * *